(12) United States Patent
Miura et al.

(10) Patent No.: US 11,512,177 B2
(45) Date of Patent: Nov. 29, 2022

(54) REFORMING DEVICE AND REFORMING METHOD FOR POROUS MATERIAL

(71) Applicant: MEIDENSHA CORPORATION, Tokyo (JP)

(72) Inventors: Toshinori Miura, Chiba (JP); Mitsuru Kekura, Numazu (JP); Naoto Kameda, Moriya (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/638,412

(22) PCT Filed: Apr. 22, 2020

(86) PCT No.: PCT/JP2020/017309
§ 371 (c)(1),
(2) Date: Feb. 25, 2022

(87) PCT Pub. No.: WO2021/038957
PCT Pub. Date: Mar. 4, 2021

(65) Prior Publication Data
US 2022/0267548 A1     Aug. 25, 2022

(30) Foreign Application Priority Data

Aug. 28, 2019 (JP) .............................. JP2019-155119

(51) Int. Cl.
| | | |
|---|---|---|
| C08J 7/12 | (2006.01) | |
| C08J 9/36 | (2006.01) | |
| B01J 15/00 | (2006.01) | |
| B29C 67/20 | (2006.01) | |

(52) U.S. Cl.
CPC ............... C08J 7/12 (2013.01); B01J 15/005 (2013.01); B29C 67/20 (2013.01); C08J 9/36 (2013.01)

(58) Field of Classification Search
CPC .... C08J 7/12; C08J 9/36; B01J 15/005; B29C 67/20
See application file for complete search history.

(56) References Cited

U.S. PATENT DOCUMENTS

| 5,069,926 A | 12/1991 | Iwata et al. |
|---|---|---|
| 2015/0125665 A1 | 5/2015 | Nakase et al. |
| 2018/0044492 A1 | 2/2018 | Miura et al. |
| 2018/0148558 A1 | 5/2018 | Miura et al. |

FOREIGN PATENT DOCUMENTS

| JP | 03-195745 A | 8/1991 |
|---|---|---|
| JP | 05-222238 A | 8/1993 |
| JP | 07-246322 A | 9/1995 |
| JP | 08-337676 A | 12/1996 |
| JP | 2009-141028 A | 6/2009 |
| JP | 2009-195786 A | 9/2009 |
| JP | 4968028 B2 | 7/2012 |
| JP | 6052470 B1 | 12/2016 |
| JP | 6057030 B1 | 1/2017 |
| WO | WO 2013/191052 A1 | 12/2013 |
| WO | WO 2014/203892 A1 | 12/2014 |
| WO | WO 2016/143897 A1 | 9/2016 |

OTHER PUBLICATIONS

Machine English translation of JP 2009-195786, Keisuke, Sep. 3, 2009.*
Japanese Office Action and English translation, Application No. 2019-155119, dated Jul. 17, 2020, 6 pages.

* cited by examiner

*Primary Examiner* — Patrick D Niland
(74) *Attorney, Agent, or Firm* — Foley & Lardner LLP

(57) ABSTRACT

A reforming device (1) is provided with, on one end side of a chamber (2), a gas supply part (3) and, on the other end side of the chamber (2), a gas discharge part (4). A support part (5) for supporting a porous material (10) is provided between the gas supply part (3) and the gas discharge part (4) inside the chamber (4). Then, the unsaturated hydrocarbon gas of an unsaturated hydrocarbon supply device (31) and the ozone gas of an ozone generation device (32) are supplied into the chamber (2) via the gas supply part (3) so as to reform the outer-peripheral-side surface and the inner side surface of the porous material (10) accommodated inside the chamber (2). The gas inside the chamber (2) is sucked by the gas discharge part (4) and discharged to the outside of the chamber (2).

5 Claims, 1 Drawing Sheet

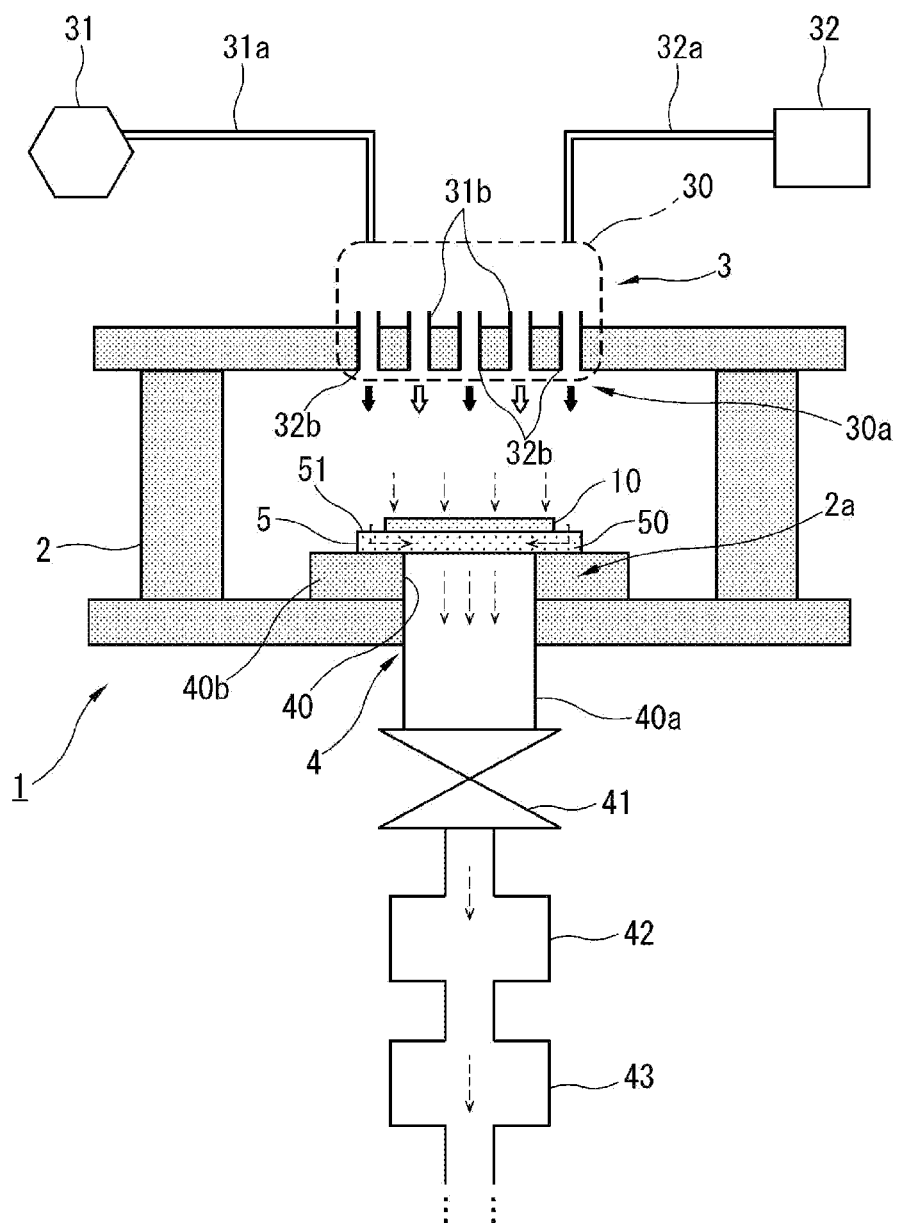

REFORMING DEVICE AND REFORMING METHOD FOR POROUS MATERIAL

TECHNICAL FIELD

The present invention relates to a reforming device and a reforming method for reforming the surface of a porous material, and to, for example, a technology for easily obtaining a reforming effect in a porous material.

BACKGROUND TECHNOLOGY

In a porous material applied in a variety of fields, it has been considered to improve various properties of a porous material by reforming the porous material so as to have hydrophilicity in accordance with a purpose.

For example, in case of a film-like or thin plate-shaped porous material (for example, a laminated film, a printed matter, a separation membrane for water treatment, or a filter), for example, the improvement of barrier properties, durability, wettability (adhesiveness) and the like has been required. In addition, in case of a porous material applied to a component member of, for example, an electric electronic equipment (for example, in case of a battery, a separator, an electrode and the like), for example, the improvement of electric characteristics and the like (in case of a battery, battery performance) has been required. In addition, in case of a porous material applied to the cultivation of a biomaterial of an artificial heart and the like (for example, a cell culture template), for example, the improvement of biocompatibility and the like has been required.

As a reforming method, a reforming method using corona discharge treatment, plasma treatment, UV ozone treatment and the like (for example, a method shown in a patent document 1, and hereinafter is simply referred to as "vapor-phase reforming method"), and a reforming method using liquid (hereinafter is referred to as "modifying liquid") such as liquid chemicals (for example, a mixed acid) and ozone water (for example, a method shown in patent documents 2 and 3, and hereinafter is simply referred to as "liquid-phase reforming method") can be cited.

PRIOR ART REFERENCES

Patent Documents

Patent Document 1: Japanese Patent 6057030
Patent Document 2: International Publication 2013/191052
Patent Document 3: International Publication 2014/203892

SUMMARY OF THE INVENTION

In case of the above-mentioned reforming methods, even if the outer-peripheral-side surface of a porous material can be reformed, for example, it is difficult to sufficiently reform the surface (hereinafter is simply referred to as "inner side surface") of micropores (hereinafter is simply referred to as "internal through hole") formed on the inner side of the porous material (for example, the reforming becomes difficult as the pore diameters of the internal through holes become smaller), and there is therefore a possibility that a reforming effect cannot be obtained.

In case of a liquid-phase reforming method, as compared with, for example, corona discharge treatment, plasma treatment and UV ozone treatment, although there is a possibility that the inner side surface can be reformed not a little (for example, the vicinity of the outer-peripheral-side surface in the inner side surface is reformed), post processing (for example, drying processing of the porous material and disposal processing of the modifying liquid) for removing modifying liquid which remains in the porous material is required. That is, in the reformation, there is a possibility that costs increase and work becomes complicated.

The present invention is made in consideration of such a technical problem, and an object of the present invention is to provide a reforming technique with which a reforming effect in the porous material can be obtained easier.

One aspect of the present invention is a reforming device for a porous material, the device including: a gas supply part which is provided on one end side of a chamber, and supplies an ozone gas and an unsaturated hydrocarbon gas into the chamber; a gas discharge part which is provided on the other end side of the chamber, and sucks the gas inside the chamber so as to discharge the gas to the outside of the chamber; and a support part which supports the porous material such that the porous material is interposed between the gas supply part and the gas discharge part inside the chamber.

The support part may be one which has a shape extending in a direction crossing the direction between the gas supply part and the gas discharge part, is provided with a plurality of through holes penetrating therethrough in the direction between the gas supply part and the gas discharge part, and is formed with, on a gas supply part side of the support part, a supporting surface for supporting the porous material.

The gas supply part may be one which is provided with a shower head formed with an injection port for injecting the unsaturated hydrocarbon gas into the chamber and an injection port for injecting the ozone gas into the chamber.

The internal pressure of the chamber is controlled to a pressure lower than the atmospheric pressure. The ozone concentration of the ozone gas supplied into the chamber is 20 volume % or higher.

Another aspect of the present invention is a reforming method of a porous material for reforming the outer peripheral side surface and the inner side surface of the porous material, the method including: supporting, inside a chamber, the porous material so as to be interposed between one end side and the other end side of the chamber; supplying an ozone gas and an unsaturated hydrocarbon gas into the chamber from a gas supply part provided on the one end side of the chamber; and sucking a gas inside the chamber by a gas discharge part provided on the other end side of the chamber so as to discharge the gas to the outside of the chamber. In addition, the ozone gas and the unsaturated hydrocarbon gas may be alternately supplied into the chamber.

According to the present invention as mentioned above, a reforming effect in the porous material can be obtained easier.

BRIEF DESCRIPTION OF THE DRAWING

FIG. 1 is a schematic block diagram for explaining a reforming device that is one example of the present embodiment.

MODE FOR IMPLEMENTING THE INVENTION

A reforming device and a reforming method for a porous material of an embodiment in the present invention is totally different from a technique (hereinafter is simply referred to as "conventional technique") for reforming a porous material by simply applying a vapor-phase reforming method or a liquid-phase reforming method.

That is, in the present embodiment, in a state in which a porous material is interposed between a gas supply part provided on one end side of a chamber and a gas discharge part provided on the other end side of the chamber, an ozone gas and an unsaturated hydrocarbon gas are supplied from the gas supply part, and the gas inside the chamber is sucked by the gas discharge part so as to be discharged to the outside of the chamber.

According to the present embodiment, the ozone gas and the unsaturated hydrocarbon gas supplied into the chamber become a mixed gas and react with each other between the gas supply part and the porous material (for example, the vicinity or the inside of the internal through holes of the porous material), and then an oxidation species (for example, OH radicals) is generated. Then, the mixed gas containing the oxidation species (hereinafter is simply referred to as "oxidation species-containing gas) flows to the gas discharge part along the outer-peripheral-side surface of the porous material or flows to the gas discharge part along the internal through holes of the porous material (that is, it flows along the inner side surface of the porous material) and then is discharged.

Consequently, as compared with the conventional techniques, the inner side surface of the porous material can be reformed easier, and desired various properties can be provided to the porous material. In addition, post processing in a liquid-phase reforming method (for example, drying processing of the porous material and post processing (disposal processing) of modifying liquid after the reformation) is not necessary, and as compared with the liquid-phase reforming method, it is possible to suppress possibilities of an increase in costs and of causing complicating work.

It is sufficient that the reforming device and the reforming method of the present embodiment have a configuration in which, as mentioned above, the porous material is supported so as to be interposed between the gas supply part and the gas discharge part in the inside of the chamber and the ozone gas and the unsaturated hydrocarbon gas supplied from the gas supply part into the chamber is sucked by the gas discharge part so as to be discharged from the gas discharge part, and the design modification thereof can be carried out by appropriately applying the common general knowledge of a variety of fields (for example, porous material fields, reforming fields, chamber fields, ozone gas fields, unsaturated hydrocarbon gas fields).

Reforming Device 1 that is One Embodiment of the Present Invention

FIG. 1 is one for explaining the configuration of a reforming device 1 that is one embodiment of the present invention. The reforming device 1 includes a chamber 2 which accommodates a porous material 10 that is an object to be reformed such that the porous material 10 can be freely taken out and put in. The chamber 2 is provided with, on the upper end side (one end side) thereof, a gas supply part 3, and with, on the lower end side (other end side) thereof, a gas discharge part 4. In addition, a support part 5 for supporting the porous material 10 is provided between the gas supply part 3 and the gas discharge part 4 in the inside of the chamber 2.

In this reforming device 1, by supplying an unsaturated hydrocarbon gas of an unsaturated hydrocarbon supply device 31 and an ozone gas of an ozone generation device 32 into the chamber 2 via the gas supply part 3, the porous material 10 accommodated in the chamber 2 can be reformed. The gas inside the chamber 2 is sucked by the gas discharge part 4 and is discharged to the outside of the chamber 2.

Regarding each component of the reforming device 1, a configuration shown in FIG. 1 and FIG. 2 of Japanese Patent No. 4968028 or a configuration shown in FIG. 5 and FIG. 6 of Japanese Patent No. 6052470 can be appropriately applied thereto, and as one embodiment, one shown in the following can be cited.

<Gas Supply Part 3>

The gas supply part 3 includes a shower head 30 provided on the upper end side of the chamber 2, and the unsaturated hydrocarbon supply device 31 and the ozone generation device 32 are connected to the shower head 30.

The unsaturated hydrocarbon supply device 31 includes, for example, a cylinder (not shown) filled with a desired unsaturated hydrocarbon gas and a valve (not shown) for carrying out the supplying and the stopping of the unsaturated hydrocarbon gas filled in the cylinder, and a pipe 31a connects between the cylinder and the shower head 30. Then, via the pipe 31a and the shower head 30, the unsaturated hydrocarbon gas is supplied into the chamber 2.

If the unsaturated hydrocarbon gas is one which reacts with an ozone gas and generates oxidation species to reform the porous material 10 so as to have hydrophilicity various kinds of unsaturated hydrocarbon gasses can be applied. For example, as an unsaturated hydrocarbon gas, one can be cited which decomposes an ozone into ketone or carboxylic acid via an unstable intermediate such as ozonide. Specifically, a gas containing an unsaturated hydrocarbon such as a hydrocarbon (alkene) having a double bond such as ethylene or a hydrocarbon (alkyne) having a triple bond such as acetylene can be cited. In addition, as an unsaturated hydrocarbon, one having a low molecular weight (for example, one having 10 or lower carbon atoms) such as butylene can be cited.

The ozone generation device 32 includes a low-concentration ozone generation portion (not shown) for generating a low-concentration ozone by, for example, silent discharge, and a high-concentration ozone generation portion (not shown) for generating a high-concentration ozone by liquefying and fractionating a low-concentration ozone, and a pipe 32a connects between each of the generation portions and the shower head 30. Then, an ozone gas having a desired concentration generated in each of the generation portions is supplied into the chamber 2 via the pipe 32a and the shower head 30. As a specific example of the high-concentration ozone generation portion, a pure ozone generator (MPOG-MP) made by MEIDENSHA CORPORATION can be cited. According to such a configuration having these ozone generation portions, a high-concentration ozone gas of 20 volume % to 100 volume % in ozone concentration can be supplied.

If the ozone gas is one which reacts with the unsaturated hydrocarbon gas and generates oxidation species to reform the porous material 10 so as to have hydrophilicity, various concentrations can be applied. The ozone concentration can be appropriately set, and as one example thereof, it can be cited that the ozone concentration of the ozone gas is 20 volume % or higher, preferably 50 volume % or higher, more preferably 90 volume % or higher.

The shower head 30 is provided on the upper end side of the chamber 2. In the shower head 30, a part 30a facing the after-mentioned gas discharge part 4 and support part 5 is formed with a plurality of injection ports 31b which is communicated with the unsaturated hydrocarbon supply device 31 (via the pipe 31*a*) and from which the unsaturated hydrocarbon gas is injected, and a plurality of injection ports 32*b* which is communicated with the ozone generation device 32 (via the pipe 32*a*) and from which the ozone gas is injected.

The injection ports 31*b*, 32*b* are formed and arranged to the part 30*a* so as to be distributed at predetermined intervals (for example, equal intervals). By these injection ports 31*b*, 32*b*, each of the unsaturated hydrocarbon gas and the ozone gas can be injected and sprayed (in the figure, each of them is injected as shown by outline arrows and blacked out arrows) to the porous material 10 supported on the after-mentioned support part 5 so as to be dispersed uniformly. Then, the unsaturated hydrocarbon gas and the ozone gas are mixed and react with each other inside the internal through holes and in the vicinity of the porous material 10, and then it becomes an oxidation species-containing gas containing oxidation species (for example, OH radicals).

<Gas Discharge Part 4>

The gas discharge part 4 includes a discharge port 40 provided on the lower end side of the chamber 2, and a discharge valve 41, an ozone killer 42 and a vacuum pump 43 are connected to a pipe 40*a* on the discharge direction side (downstream side) of the discharge port 40. Then, by the suction force of the vacuum pump 43, the inside of the chamber 2 is controlled so as to be maintained in a decompression state (state in which the inner pressure is lower than the atmospheric pressure), and the gas (for example, an oxidation species-containing gas) inside the chamber 2 is sucked and discharged to the outside of the chamber 2.

The decompression state of the inside of the chamber 2 can be appropriately adjusted in a range in which a desired reformation of the porous material 10 can be carried out, during, for example, supplying the gasses from the respective unsaturated hydrocarbon supply device 31 and the ozone generation device 32. For example, by appropriately controlling the opening degree of the discharge valve 41 and appropriately operating the vacuum pump 43, the decompression state of the inside of the chamber 2 can be adjusted. Specifically, the inside of the chamber 2 is adjusted and decompressed so as to be several thousands of Pa or lower (for example, approximately 1000 Pa or lower), preferably several hundreds of Pa or lower (for example, approximately 130 Pa). In addition, it is preferable that a configuration having resistance to ozone (for example, a dry pump) is applied to the vacuum pump 43.

In the lower end side of the chamber 2, the configuration of the discharge port 40 is not limited to one shown in FIG. 1 in which only one discharge port 40 is formed, and a configuration may be applied in which a plurality of discharge ports 40 are formed. In case where a plurality of discharge ports 40 are formed, a configuration can be cited in which the discharge ports 40 are arranged and distributed to a part 2*a* facing the support part 5 at predetermined intervals (for example, equal intervals), in the lower end side of the chamber 2. In addition, the shape of the discharge port 40 is also not limited, and can be set appropriately. For example, the shape of the discharge port 40 is set to have a size covered with the plate-shaped support part 5 as shown in FIG. 1.

<Support Part 5>

The support part 5 is positioned between the gas supply part 3 and the gas discharge part 4 in the inside of the chamber 2, and has a flat plate shape extending in the direction (horizontal direction in FIG. 1) crossing the direction therebetween. In addition, the support part 5 is provided with a plurality of through holes 50 penetrating therethrough in the thickness direction (direction between the gas supply part 5 and the gas discharge part 4) of the support part 5. Then, by a support surface 51 on the gas supply part 3 side of the support part 5, the porous material 10 is supported.

The through holes 50 each have a shape through which the oxidation species-containing gas can pass, and are appropriately formed such that the porous material 10 as an object can be supported. As a specific example of the support part 5 formed with the through holes 50, a sample holder formed by a mesh-like wire net can be cited.

In addition, for example, the support part 5 may be provided with a moving mechanism (for example, a moving stage not shown) for appropriately moving the support part 5 (in, for example, the horizontal direction in FIG. 1) to a desired position and a heating mechanism (for example, a thermocouple device or an infrared heater not shown) for appropriately heating the porous material 10, in order to improve reforming performance.

In case of the support part 5 shown in FIG. 1, the outer peripheral edge side of the support part 5 is supported on and fixed to an opening edge portion 40*b* so as to cover the discharge port 40.

<Porous Material 10>

The porous material 10 is not particularly limited if it is one which has porosity such that the oxidation species-containing gas can pass through and flow into the internal through holes, and which can be supported by the support part 5 so as to be reformed.

For example, as a shape of the porous material 10, various kinds of shapes can be used, and, for example, a solid shape, a film shape, a sheet shape, a cloth-like shape and a fiber shape can be cited. As an object to be applied of the porous material 10, a laminated film, a printed matter, a separation membrane for water treatment, a filter, a battery component member (separators, electrodes and the like), a cell culture template and the like can be cited.

In case where the porous material 10 is made of resin (for example, in case of a porous plastic film), as the resin, not only thermoplastic resin but also thermosetting resin can be cited. As a specific example of the resin, one can be cited which is made by using a material such as polyester resin, aramid resin, olefin resin, polypropylene resin, PPS (polyphenylene sulfide) resin, PET (polyethylene terephthalate) resin or the like alone or in combination with each other. In addition, one can be cited which uses, as a material, PE (polyethylene), POM (polyoxymethylene or acetal resin), PEEK (polyether ether ketone), ABS resin (acrylonitrile, butadiene, styrene copolymer resin), PA (polyamide), PFA (tetrafluoroethylene, perfluoroalkoxyethylene copolymer), PI (polyimide), PVD (polyvinyl chloride), PC (polycarbonate), PEN (1) (polyether nitrile), PEN (2) (polyethylene naphthalate) or the like.

OTHERS

The supply ratio of the ozone gas and the unsaturated hydrocarbon gas, reforming treatment time, a reforming treatment temperature, the total pressure of the mixed gas of the ozone gas and the unsaturated hydrocarbon gas (oxidation species-containing gas in case where an oxidation species is generated), and the distance between the shower head 30 and the porous material 10 can be appropriately set according to, for example, a mode of the reforming device 1 and the porous material 10.

As an example of the supply ratio, it is set such that the molar ratio of the ozone to the unsaturated hydrocarbon is 1:1 to 4:1, preferably 4:1, more preferably 2:1 to 4:1.

As an example of the reforming treatment time, it is set to several minutes or less (for example, one minute or less), more preferably several seconds to several tens of seconds (for example, three seconds to twenty seconds). If the reforming treatment time becomes long (for example, over several minutes), there is a possibility that the porous material 10 itself is deformed and the color thereof is changed (for example, it is clouded), or the surface of the porous material 10 becomes rough, and it is preferable to appropriately set the reforming treatment time. Therefore, the reforming treatment time can be appropriately set in a range in which the deformation and the discoloration (cloudiness) of the porous material 10 do not occur, and the surface of the porous material 10 does not become rough.

As an example of the reforming treatment temperature, it is set to a relatively low temperature. However, in order to enhance an effect of the reforming treatment, the porous material 10 may be heated in a range in which the porous material 10 is not deformed and deteriorated. For example, in case where the porous material 10 is made of resin, the porous material 10 is heated in a range of the glass transition temperature or lower.

As an example of the total pressure of the mixed gas of the ozone gas and the unsaturated hydrocarbon gas, it is controlled to a range of several Pa to several thousands of Pa, more preferably a range of a medium vacuum of 50 Pa to a low vacuum of 500 Pa. By controlling the total pressure as above, there is a possibility to suppress the occurrence of the rapid decomposing reaction of an unstable intermediate such as ozonide generated in the process of the reaction between the ozone and the unsaturated hydrocarbon, and the occurrence of the uncontrollability of the reaction.

The distance between the shower head 30 and the porous material 10 is appropriately set such that the uniformity of the gas flow by the shower head 10 (namely, the uniformity of the reforming treatment) does not deteriorate. As an example thereof, the distance between the shower head 30 and the porous material 10 is set to several mm to several tens of mm (for example, approximately 5 mm).

When the porous material 10 was reformed by applying the reforming device 1 configured as above, it was confirmed that not only the outer-peripheral-side surface but also the inner side surface of the porous material 10 were reformed.

That is, according to the reforming device 1, it is possible to flow the oxidation species-containing gas generated by the unsaturated hydrocarbon gas and the ozone gas supplied into the chamber 2 to the gas discharge part 4 along the outer-peripheral-side surface of the porous material 10 as shown by, for example, the dotted line arrows in FIG. 1, or to flow it to the gas discharge part 4 along the internal through holes of the porous material 10 (that is, it flows passing through along the inner side surface of the porous material 10), and a desired reformation of the porous material 10 can be therefore carried out.

As the above, although only a described specific embodiment has been explained in detail, it is obvious to a person skilled in the art that various changes can be performed within a scope of the technical idea of the present invention, and it is natural that such changes belong to the scope of the claims of the present invention.

For example, in the gas supply part 3 in FIG. 1, a configuration can be cited in which a nozzle is applied instead of the shower head 30. Specifically, a configuration can be cited in which nozzles (not shown) are connected to the respective distal ends of the pipes 31a, 32a, such that the injecting ports of the respective nozzles face the porous material 10. In case of such a configuration, the unsaturated hydrocarbon gas and the ozone gas are injected and sprayed to the porous material 10 so as to be dispersed uniformly from corresponding ones of the injecting ports of the nozzles, and thereby a working effect similar to the reforming device 1 in FIG. 1 can be obtained.

In addition, the ozone gas and the unsaturated hydrocarbon gas may be simultaneously supplied into the chamber 2 (hereinafter is simply referred to as "simultaneous supply"), or may be alternately supplied thereinto (for example, they are supplied with a time difference, and hereinafter is simply referred to as "alternate supply"). As the alternate supply; a technique can be cited in which only the unsaturated hydrocarbon gas is supplied in advance, and, after a predetermined time has elapsed from the stopping of the supply of the unsaturated hydrocarbon gas (for example, while the supplied unsaturated hydrocarbon gas remains in the vicinity of and in the inside of the internal through holes of the porous material 10), only the ozone gas is supplied. Alternatively, after the unsaturated hydrocarbon gas is supplied, the gas inside the chamber 2 is completely discharged, and then only the ozone gas is supplied in a state in which gas molecules are adsorbed on the inner side surface (surfaces of the pores of the porous material 10). With this, the detail part of the porous material 10 can be further uniformly reformed.

In case of the simultaneous supply, there is a tendency that the unsaturated hydrocarbon gas and the ozone gas are mixed before flowing into the internal through holes and the mixed gas becomes an oxidation species-containing gas. In such an oxidation species-containing gas before flowing into the internal through holes, in case where, for example, the porous material 10 has a thick structure, or the internal through holes are each relatively fine, it can be considered that an oxidation species is deactivated before the oxidation species-containing gas is dispersed into the entire internal through holes.

On the other hand, in case of the alternate supply, there is a tendency that the unsaturated hydrocarbon gas supplied in advance so as to flow into the internal through holes is mixed with the ozone gas flowing into the internal through holes after the flowing of the unsaturated hydrogen gas, and then it becomes an oxidation species-containing gas. In such an oxidation species-containing gas generated by the mixture inside the internal through holes, as compared with an oxidation species-containing gas generated in the simultaneous supply, the oxidation species-containing gas can be easily dispersed into the entire internal through holes before an oxidation species is deactivated. On the other hand, in case where only the ozone gas reacts with the unsaturated hydrocarbon molecules adsorbed on the inner side surface, the reaction of the ozone gas occurs only on the inner side surface on which the unsaturated hydrocarbon molecules have been adsorbed, and the reformation is performed. With this, even if the concentration of the ozone gas is not high (for example, even, if the concentration of the ozone gas is lower than 20 volume %), a desired reformation of the porous material 10 is realized easier.

The invention claimed is:

1. A reforming method for a porous material for reforming an outer-peripheral-side surface and an inner side surface in the porous material, the method comprising:

supporting, inside a chamber, the porous material so as to be interposed between one end side and an other end side of the chamber;

supplying an ozone gas and an unsaturated hydrocarbon gas into the chamber from a gas supply part provided on the one end side of the chamber; and sucking a gas inside the chamber by a gas discharge part provided on the other end side of the chamber so as to discharge the gas to an outside of the chamber, wherein the ozone gas and the unsaturated hydrocarbon gas are alternately supplied into the chamber.

2. The reforming method for the porous material according to claim 1, wherein the porous material is supported by a support part, wherein the support part has a shape extending in a direction crossing a direction between the gas supply part and the gas discharge part, is provided with a plurality of through holes penetrating therethrough in the direction between the gas supply part and the gas discharge part, and is formed with, on a gas supply part side thereof, a supporting surface for supporting the porous material.

3. The reforming method for the porous material according to claim 1, wherein the gas supply part is provided with a shower head formed with an injection port for injecting the unsaturated hydrocarbon gas into the chamber and an injection port for injecting the ozone gas into the chamber.

4. The reforming method for the porous material according to claim 1, wherein an internal pressure of the chamber is controlled to a pressure lower than an atmospheric pressure.

5. The reforming method for the porous material according to claim 1, wherein an ozone concentration of the ozone gas supplied into the chamber is 20 volume % or higher.

* * * * *